United States Patent Office 3,799,798
Patented Mar. 26, 1974

3,799,798
METHOD OF BONDING A POLYSULFIDE SEALANT TO A MASONRY SURFACE
Richard L. Elmer, Trenton, and Elizabeth A. Peterson, Levittown, N.J., assignors to Thiokol Chemical Corporation, Bristol, Pa.
No Drawing. Original application Mar. 18, 1971, Ser. No. 125,883, now abandoned. Divided and this application Apr. 26, 1972, Ser. No. 247,717
Int. Cl. B32b *13/12*; B44d *1/14*
U.S. Cl. 117—72
4 Claims

ABSTRACT OF THE DISCLOSURE

A fluid primer adapted to be applied to masonry surfaces to improve the adhesion thereto of sealant compositions based on liquid polysulfide polymers. The primer comprises an organic solvent solution of a chlorinated rubber and a poly(lower alkyl methacrylate), preferably poly(n-butyl methacrylate). The primer provides a bond which exhibits both good adhesion and resistance to ultra-violet light.

---

This is a division of application Ser. No. 125,883, filed Mar. 18, 1971, now abandoned.

This invention relates to the application of polysulfide polymer-based sealants to masonry surfaces and more particularly to a novel primer adapted to be applied to a masonry surface such as a concrete or cement surface before the sealant is applied thereto to improve the adherence of the sealant to the concrete.

Polysulfide polymer-based sealants are well known in the art and have been extensively used for forming elastomeric seals between surfaces of such materials as metals, glass, concrete and the like. When properly formulated and cured, they form elastomeric seals that are highly resistant to moisture, sunlight, temperature variations and solvents and retain their elastomeric character after exposure to varying atmospheric conditions for long periods of time.

The polysulfide polymers commonly used in polysulfide based sealants are liquid polymers that may be prepared, for example, as described in U.S. Pat. 2,466,963. As disclosed in the latter patent, high molecular weight polymers can be prepared which can then be split to form polythiopolymercaptan polymers having molecular weights of the order of 300 to 25,000 and which are viscous liquids having viscosities within the range 300 to 150,000 centipoises at 25° C. Such liquid polymers can be cured by any of various curing agents as disclosed in U.S. Pat. 2,466,963 to form solid elastomers having excellent resistance to acids, alkalis, petroleum hydrocarbons and atmospheric moisture and oxidation. In general, such polymers may be represented by the formula $$HS(RS_n)_mRSH$$

wherein $n$ has an average value of 1.5 to 5, $m$ may vary from say 2 to 70 and R is a divalent hydrocarbon, oxahydrocarbon or thiahydrocarbon radical. One of the most widely used liquid polythiopolymercaptan polymers is made by reacting bis-beta-chloroethylformal with a sodium sulfide solution in the presence of a small percentage of trichloropropane to form a solid polymer which when split as disclosed in U.S. Pat. 2,466,963 yields a liquid polymer largely composed of the recurring units $$(S.CH_2.CH_2.O.CH_2.O.CH_2.CH_2.S)$$

and having free mercapto terminals and from say 0.1 to 4% of cross-linking.

As disclosed in U.S. Pat. 2,466,963, the liquid polymers can be cured by a wide variety of curing agents to form solid elastomers having excellent resistance to acids, alkalis, petroleum hydrocarbons and atmospheric oxidation. Suitable curing agents include organic oxidizing agents such as benzoyl peroxide, dicumyl peroxide, dibutyl tin oxide and nitrobenzenes; and inorganic peroxides including the alkali metal and alkaline earth metal peroxides, such as sodium peroxide, lithium peroxide, calcium peroxide, barium peroxide; as well as zinc peroxide, lead peroxide, antimony peroxide, manganese dioxide and sodium perborate.

Sealant compositions based on the liquid polysulfide polymers commonly contain in addition to the polymer and curing agent various additives such as finely divided inorganic fillers, plasticizers, thixotropic agents, cure accelerating or retarding agents and adhesion promotors. The sealant may be of the two-part or one-part type. In the case of two-part sealants, the liquid polymer and one or more additives may be placed in one package and the curing agent and one or more additives in a second package. The two packages are shipped to the point of use and mixed just prior to being used. Such two-part sealants are subject to certain disadvantages because of the fact that for best results the components of the sealant should be carefully mixed under controlled conditions to insure thorough mixing of the ingredients in the proper proportions and the skilled labor to insure such conditions is not always available at the point of use. For this reason a number of types of one-package sealants have been proposed and used, and such one-package sealants are generally preferred.

One-package sealants based on liquid polythiopolymer-captan polymers are disclosed, for example, in U.S. Pats. 3,225,017, 3,349,047 and 3,499,864. In general, such one-part sealants are formulated by using curing agents which do not react with the liquid polymer at ambient temperature when kept in a sealed package but when exposed to the atmosphere become activated by atmospheric moisture or oxygen to effect the desired cure of the polysulfide polymer. In certain of the one-part sealant compositions as disclosed, for example, in U.S. Pat. 3,225,017, a deliquescent accelerating agent is included in the composition to accelerate the cure when the sealant composition is exposed to the atmosphere. Such accelerating agents may include alkali metal and alkaline earth metal oxides, peroxides and hydroxides. In other compositions such as disclosed in U.S. Pat. 3,402,155, a basic compound such as an amine is used to activate the cure of the polymer through its mercapto terminals. As disclosed in U.S. Pat. 3,499,864, the storage stability of the latter type of sealant composition can be improved by incorporating a relatively small amount of elemental sulfur as a stabilizing agent.

Because of their resistance to the effects of atmospheric moisture, oxygen and sunlight, the polysulfide polymer-based sealants are useful in sealing cracks in and joints between masonry structures, as well as coating such structures. However, some difficulty has been encountered in securing adequate adhesion of the sealant composition to such structures, and accordingly, it is the usual practice to apply a fluid primer to the masonry structure before application of the sealant composition thereto. As in the case of the sealants themselves, primer compositions may be two-part or one-part primers, that is to say, the primer may be supplied in separate packages which are mixed at the point of use just before application to the masonry structure. Such two-part primers are subject to the disadvantages noted above in connection with the two-part sealant compositions and therefore one-package primers are preferred. Such one-package primers commonly comprise a volatile organic solvent solution of a solid material that will coat the masonry surface and provide the desired adhesion between the cured sealant and the masonry surface. The solutes previously proposed for such primers include, for example, chlorinated rubber, chlorinated biphenyl, substituted silanes such as epoxy silane and mercapto alkyl silanes, e.g., mercaptopropyl trimethoxysilane and low molecular weight urethane prepolymers, e.g., the condensation product of trimethylol propane and toluene diisocyanate. Typical solvents include lower aliphatic hydrocarbons, aromatic hydrocarbons such as toluene and xylene, lower alkanols and glycol esters.

In formulating such one-part primer compositions certain difficulties have been encountered in obtaining a composition which both provides the desired degree of adhesion of the sealant composition to the masonry substrate and which is also resistant to the ultra-violet components of sunlight. Thus among the primers previously proposed, those that provide adequate adhesion of the sealant composition to the masonry substrate tend to be excessively sensitive to the effects of ultra-violet light as evidenced by the fact that they rapidly become discolored upon exposure to sunlight, whereas those primer compositions which are relatively unaffected by ultra-violet light do not provide acceptable adhesion of the polysulfide polymer-based sealant to the masonry structure.

It is accordingly an object of the present invention to provide an improved fluid primer adapted to be applied to a masonry structure to improve the adhesion of polysulfide polymer-based sealants thereto. It is another object of the invention to provide a fluid primer for application to masonry surfaces which provides good adhesion of the polysulfide polymer based sealant to the substrate and is also substantially unaffected by exposure to ultra-violet light. Other objects of the invention will be in part obvious and in part pointed out hereafter.

The objects of the present invention are achieved, in general, by formulating a primer which comprises an organic solvent solution of a mixture of a chlorinated rubber and a lower alkyl methacrylate polymer, i.e., a methacrylate polymer in which the alkyl group contains from 1 to 4 carbon atoms. The preferred methacrylate polymer for use in primers embodying the invention is poly-n-butyl methacrylate. The proportions of the two solutes used may vary from say 10% to 90% by weight of the chlorinated rubber and from 90% to 10% by weight of the methacrylate polymer. The preferred proportions are 60% to 80% by weight of the chlorinated rubber and 20% to 40% of the methacrylate polymer. The volatile solvent used may be of the type described above in connection with prior primers, i.e., volatile aliphatic or aromatic hydrocarbon solvents, e.g., mineral spirits, toluene or xylene or glycol esters, especially ether esters such as the methyl or ethyl ether of ethylene glycol acetate, as well as mixtures of the hydrocarbon and glycol ester solvents. It has been found that fluid primers formulated as disclosed herein and illustrated in the following examples provide excellent adhesion between masonry surfaces and cured sealant compositions based upon liquid polythiopolymercaptan polymers and also exhibit good resistance to the action of ultra-violet light.

The examples given below give the results obtained when using the present primers in conjunction with two types of sealants referred to in the examples as Sealant A and Sealant B. Both of these sealants were based on the same liquid polysulfide polymer identified in the examples as LP-32 and having essentially the structure $$H(SC_2H_4 \cdot O \cdot CH_2 \cdot O \cdot C_2H_4S)_{23}H$$

with about 0.5% cross-linking and an average molecular weight of about 4000. Sealant A had essentially the following formulation in parts by weight:

| | |
|---|---|
| LP-32 polymer | 100 |
| Thixotropic agent (Thixcin R) | 7 |
| Calcium carbonate | 57 |
| Titanium dioxide | 15 |
| Chlorinated diphenyl (Arochlor 1254) | 6 |
| Butylbenzylphthalate (Santicizer 160) | 25 |
| Sulfur | 0.3 |
| Zinc peroxide | 8.0 |
| Lithium peroxide | 0.75 |
| Ethylene diamine (10% by weight) on a 5A molecular weight sieve | 2.0 |

Sealant B had essentially the following formulation in parts by weight:

| | |
|---|---|
| LP-32 polymer | 100 |
| Titanium dioxide | 20 |
| Calcium carbonate | 40 |
| Chlorinated biphenyl (Arochlor 1254) | 30 |
| 80% solution of epoxy resin (Epon 1001) in methyl ethyl ketone | 5 |
| Calcium peroxide | 10.5 |
| Barium oxide | 10 |
| Partially hydrogenated terphenyl plasticizer HB-40 | 10 |
| Toluene | 3.75 |

In the following examples the acrylic polymer used was a poly(n-butyl methacrylate) in solution in a hydrocarbon solvent (Acryloid F-10). The solution contained 40% by weight of the polymer. A substantially fully chlorinated rubber (Parlon S-10) was used. Varying amounts of the Acryloid F-10 and Parlon S-10 were mixed with a solvent which was a mixture of equal parts by weight of toluene and ethylene glycol ethyl ether acetate (Cellosolve acetate).

The primers were applied to concrete surfaces and the solvent permitted to evaporate. Thereafter a bead of one of the sealants identified above was applied to the primed surface and cured thereon. The resulting assembly was subjected to various test conditions as indicated in the table given below and the bead was then stripped from the concrete surface to determine whether adhesive or cohesive failure occurred. In the table "C" indicates cohesive failure, that is, failure occurred by rupture of the bead rather than separation of the bead from the substrate. "A-C" indicates that the failure was partly cohesive and partly adhesive and "NA" indicates that the failure was adhesive. The proportions of the ingredients are given in parts by weight.

TABLE

| Example number | 1 | 2 | 3 |
|---|---|---|---|
| Acryloid F-10 | 25 | 25 | 25 |
| Parlon S-10 | 25 | 15 | 5 |
| Solvent | 35 | 35 | 35 |

After 1 week at 100° F. and 100% relative humidity

| Sealant: | | | |
|---|---|---|---|
| A | C | C | C |
| B | C | C | C |

After 1 week at 100° F. and 100% relative humidity followed by 1 week exposure to ultra-violet light

| | | | |
|---|---|---|---|
| A | C | C | C |
| B | C | C | C |

After 1 week at 100° F. and 100% relative humidity followed by 1 week immersion in water

| | | | |
|---|---|---|---|
| A | C | C | C |
| B | C | A-C | NA |

Each of the primer solutions 1, 2 and 3 was exposed as such to ultra-violet light for a period of 20 days and showed only a slight discoloration at the end of this period.

From the foregoing description it should be apparent that the present invention provides a primer capable of meeting the objectives set forth above. When applied to masonry surfaces it provides excellent bonding between such surfaces and subsequently applied sealants based on liquid polysulfide polymers. Also it is only slightly discolored when exposed to ultra-violet light and maintains its bonding efficiency when the bonded sealant is exposed to ultra-violet light.

While the foregoing examples illustrate the use of the present primer in bonding one-part sealants to masonry surfaces, it is, of course, to be understood that the primer can also be used in promoting the adhesion of two-part sealants to masonry surfaces. Also the examples are intended to be illustrative only and numerous changes can be made in the ingredients and proportions illustratively set forth therein witholt departing from the scope of the invention as defined in the appended claims.

We claim:

1. A method of bonding a sealant to a masonry surface comprising the steps of applying to said masonry surface a primer consisting essentially of an organic solvent solution of from 10 % to 90% by weight of a chlorinated rubber and from 90% to 10% by weight of a poly(lower alkyl methacrylate) wherein the alkyl group has from 1 to 4 carbon atoms, evaporating the solvent of said primer, applying to the primed surface a curable sealant composition based on a liquid polysulfide polymer and curing said sealant composition in situ.

2. A method according to claim 1 wherein said chlorinated rubber is a substantially fully chlorinated rubber and said poly(lower alkyl methacrylate) is a poly(n-butyl methacrylate).

3. A method according to claim 2 wherein said solution contains from about 60% to 80% by weight of said chlorinated rubber and from about 20% to 40% by weight of said poly(n-butyl methacrylate).

4. A method according to claim 1 wherein the solvent of said solution comprises a mixture of a volatile liquid hydrocarbon and ethylene glycol ethyl ether acetate.

References Cited

UNITED STATES PATENTS

| | | | |
|---|---|---|---|
| 3,518,107 | 6/1970 | Millen | 117—72 |
| 2,364,589 | 12/1944 | Raynolds et al. | 260—3.5 |
| 3,457,099 | 7/1969 | De Angelo et al. | 117—72 X |
| 3,453,243 | 7/1969 | Hartlein | 117—72 X |
| 3,297,473 | 1/1967 | Bulbenko | 117—72 |

RALPH HUSACK, Primary Examiner

U.S. Cl. X.R.

117—33.3, 77, 123 D; 260—3.5, 31.4 R